US012173554B2

(12) United States Patent
Joossen et al.

(10) Patent No.: US 12,173,554 B2
(45) Date of Patent: Dec. 24, 2024

(54) SLIDING WINDOW OR IMPROVED SLIDING DOOR AND GLAZING BEAD SUPPORTS APPLIED THEREBY

(71) Applicant: REYNAERS ALUMINIUM Naamloze Vennootschap, Duffel (BE)

(72) Inventors: Ben Joossen, Brasschaat (BE); Stefan Vandervelden, Berchem (BE)

(73) Assignee: REYNAERS ALUMINIUM NAAMLOZE VENNOOTSCHAP, Duffel (BE)

( * ) Notice: Subject to any disclaimer, the term of this patent is extended or adjusted under 35 U.S.C. 154(b) by 14 days.

(21) Appl. No.: 17/787,420

(22) PCT Filed: Dec. 18, 2020

(86) PCT No.: PCT/IB2020/062175
§ 371 (c)(1),
(2) Date: Jun. 20, 2022

(87) PCT Pub. No.: WO2021/130632
PCT Pub. Date: Jul. 1, 2021

(65) Prior Publication Data

US 2023/0167670 A1 Jun. 1, 2023

(30) Foreign Application Priority Data

Dec. 23, 2019 (BE) .................................. 2019/5969

(51) Int. Cl.
*E06B 3/263* (2006.01)
*E05D 15/06* (2006.01)
(Continued)

(52) U.S. Cl.
CPC ........ *E06B 3/4609* (2013.01); *E05D 15/0673* (2013.01); *E06B 3/26347* (2013.01); *E06B 3/5409* (2013.01); *E06B 3/5821* (2013.01)

(58) Field of Classification Search
CPC ........................... E06B 3/26347; E06B 3/5481
See application file for complete search history.

(56) References Cited

U.S. PATENT DOCUMENTS 4,569,154 A * 2/1986 Bayer ................. E06B 3/26347 49/504
9,080,359 B2 * 7/2015 Horwood ............ E05D 15/0669
(Continued)

FOREIGN PATENT DOCUMENTS

DE 29820399 U1 3/2000
DE 19925495 A1 * 12/2000 ........... E06B 3/5409
(Continued)

OTHER PUBLICATIONS

International Search Report and Written Opinion dated Mar. 1, 2021 pertaining to PCT international application No. PCT/IB2020/062175 filed Dec. 18, 2020, pp. 1-12.

*Primary Examiner* — Catherine A Kelly
*Assistant Examiner* — Patrick B. Ponciano
(74) *Attorney, Agent, or Firm* — Dinsmore & Shohl LLP

(57) ABSTRACT

Improved sliding window or sliding door with a leaf with a leaf frame that is composed of leaf profiles which each comprise two half-shells which are thermally connected to each other by an intermediate thermal insulator, whereby in the leaf frame a rebate is provided for a panel which is supported by one or more glazing bead supports in the rebate and whereby the leaf frame is supported by one or more roller cassettes with rollers, wherein at least one glazing bead support comprises a feed-through section for transmitting the weight of the panel or a part thereof to at least one concerned roller cassette and that this feed-through section extends through a bottom leaf profile of the leaf frame up to a roller cassette.

17 Claims, 5 Drawing Sheets

(51) Int. Cl.

| | |
|---|---|
| ***E06B 3/46*** | (2006.01) |
| ***E06B 3/54*** | (2006.01) |
| ***E06B 3/58*** | (2006.01) |

(56) References Cited

U.S. PATENT DOCUMENTS

2009/0019665 A1* 1/2009 Kelley ............................ 16/105
2015/0128521 A1* 5/2015 Vandervelden ....... E06B 3/5409
52/656.5

FOREIGN PATENT DOCUMENTS

| | | | | | |
|---|---|---|---|---|---|
| DE | 10044192 | C1 | * | 4/2002 | ........... E06B 3/5409 |
| EP | 2708693 | A1 | | 3/2014 | |
| EP | 2840219 | A1 | | 2/2015 | |
| EP | 3418484 | A1 | | 12/2018 | |
| FR | 1403461 | | * | 3/2005 | |
| GB | 2278145 | | * | 11/1994 | |
| KR | 101661892 | B1 | * | 12/2015 | |
| KR | 102463490 | B1 | * | 11/2022 | |

* cited by examiner

SLIDING WINDOW OR IMPROVED SLIDING DOOR AND GLAZING BEAD SUPPORTS APPLIED THEREBY

CROSS-REFERENCE TO RELATED APPLICATIONS

The present application is the National Phase entry of International Patent Application No. PCT/IB2020/062175 filed Dec. 18, 2020, which claims priority to Belgium Patent Application No. 2019/5969 filed Dec. 23, 2019, the entire contents of both are hereby incorporated by reference into this application.

TECHNICAL FIELD

The present disclosure relates to a sliding window or a sliding door.

More specifically, the present disclosure relates to such sliding window or sliding door with a slideable leaf in a fixed frame which by one or more roller blocks is movably supported in the fixed frame.

In particular the present disclosure relates to a sliding window or sliding door with a frame that is composed of profiles each comprising two half-shells, which are thermally separated by an intermediate thermal insulator, whereby the thermal insulator also connects the two half-shells with each other, whereby in the frame a rebate is provided in which a glass panel or the like is placed and whereby the frame is supported by rollers with which the frame can move over a rail or the like, for example in a groove of an underlying profile of the fixed frame.

Any references to sliding window are understood to mean sliding doors as well.

BACKGROUND

Many such sliding windows are already known in prior art, but they can still be improved upon.

The current trend is that ever bigger sliding windows are applied, whereby the glass panels take on ever bigger dimensions as well, ever bigger thicknesses, for example because double or even triple glazing is applied.

The consequence is that the weight of such glass panels takes on ever greater proportions.

Additionally, the thermal insulation of the profiles of the sliding window needs to meet ever higher requirements, such that the dimensions of the thermal insulator which is applied between the half-shells become ever bigger.

Typically, the thermal insulators are made with low-strength materials and are therefore less suitable or not at all suitable for absorbing certain loads.

In short, on the one hand the load exercised by the weight of the applied glass panels on the profiles of the sliding windows increases, whereas on the other hand the profiles are increasingly weakened due to the bigger dimensions of the intermediate insulator.

This leads to problems when transmitting the occurring forces to the rollers of such sliding window or sliding door.

SUMMARY

The purpose of the present disclosure is therefore to provide a solution to one or several of the aforementioned or possible other disadvantages.

More specifically the present disclosure aims to provide an improved sliding window or sliding door in which the load coming from the weight of the panel is transmitted to the rollers of the sliding window or the sliding door thus reducing the impact on the leaf.

Another purpose of the present disclosure consists in making a further development to even bigger sliding windows with even heavier glass panels than can be realised with the current techniques, possible.

Yet another purpose of the present disclosure consists in providing a solution which in no way whatsoever detracts from the thermal insulation of the used profiles.

To this end, the present disclosure relates to an improved sliding window or sliding door with a leaf with a leaf frame that is composed of leaf profiles which each comprise two half-shells which are thermally connected to each other by an intermediate thermal insulator, whereby the leaf frame contains a rebate and one or more glazing bead supports and a panel supported by one or more glazing bead supports in the rebate and whereby the leaf frame is supported by one or more roller cassettes with rollers, whereby the one or more glazing bead supports are separate from the roller cassettes, wherein at least one glazing bead support comprises a feed-through section for transmitting the weight of the panel or a part thereof to at least one concerned roller cassette and that this feed-through section extends through a bottom leaf profile up to a roller cassette.

A big advantage of such sliding window or sliding door according to the present disclosure is that it comprises the glazing bead supports with which the weight of the panel is transmitted directly through the bottom profile of the leaf frame to the rollers, contrary to what was the case for the known sliding windows, whereby the weight of the plate is transmitted to the rollers via the half-shells.

As is generally known, the thermal insulator is located vertically, or practically vertically, under the panel.

According to the present disclosure the glazing bead supports are applied, the feed-through sections of which extend at least partially through the thermal insulator up to the rollers, which are also located vertically, or practically vertically, under the panel.

In this way, the weight of the panel is transmitted to the rollers according to the vertical direction.

This is of course a very efficient way to support the weight.

In some embodiments of a sliding window or sliding door according to the present disclosure, a glazing bead support of the sliding window comprises a plate-shaped section which is intended to support an edge of the panel and whereby the feed-through section is formed by one or more protrusions which extend a certain length in complementary passages provided in the thermal insulator.

Such embodiment of a sliding window or sliding door according to the present disclosure is very advantageous because the glazing bead supports first and foremost are very simple to produce and because the adjustments in the form of a number of passages to the thermal insulator are very limited.

Moreover, the size of the plate-shaped section of the glazing bead supports ensures a well-distributed support of the panel, whereas the feed-through sections in the form of protrusions have a rather limited size, such that the insulation of the thermal insulator is practically not affected.

In some embodiments, the glazing bead support is also made in a synthetic material or the like, such that it does not form a thermal bridge through a profile of the sliding window or sliding door.

The present disclosure also relates to such glazing bead support which is intended for application in a sliding window or sliding door according to the present disclosure.

BRIEF DESCRIPTION OF THE DRAWINGS

With the intention of better showing the characteristics of the present disclosure, the following embodiments of a sliding window or sliding door and a glazing bead support applied thereby according to the present disclosure are described by way of an example without any limiting nature, with reference to the accompanying drawings, wherein.

DETAILED DESCRIPTION

Figure 1:
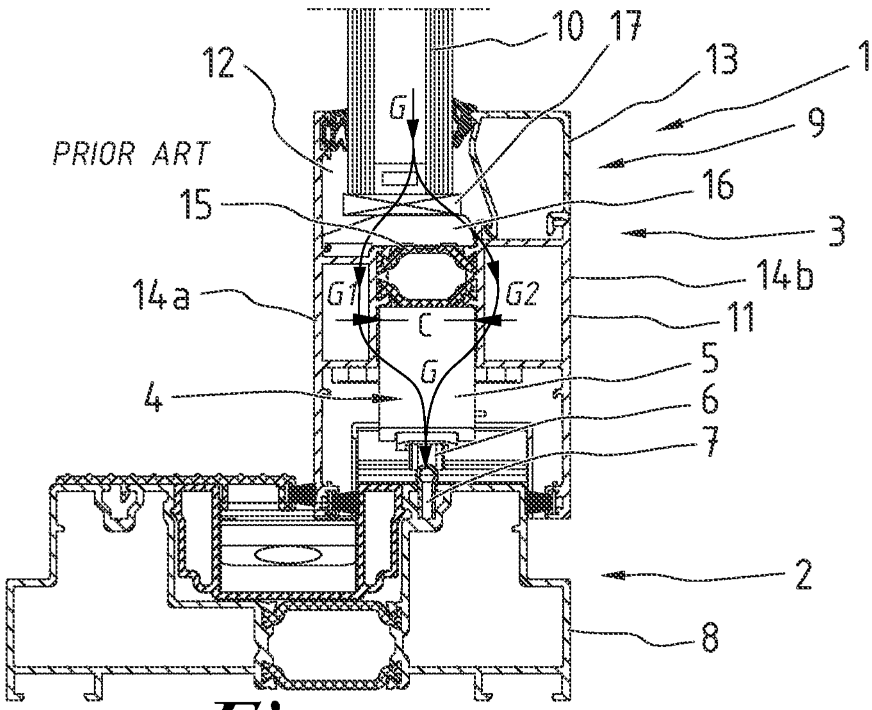
FIG. 1 shows a cross-section of the bottom part of a known sliding window.

FIG. 1 shows a cross-section of a known classic sliding window 1.

Typically, such sliding window 1 has a fixed frame 2 with which the sliding window 1 is mounted in a wall or the like and a movable leaf 3 in the fixed frame 2 which is borne by one or more roller cassettes 4 with a housing 5 and one or more freely rotatable rollers 6 therein which are guided on a rail 7 of the bottom profile 8 of the fixed frame 2.

The leaf 3 contains a leaf frame 9 in which a panel 10 is mounted, for example a glass panel with double or triple glazing as shown in FIG. 1.

The leaf frame 9 is constructed from compound insulated leaf profiles 11 with a rebate 12 in which the panel 10 is held by glazing beads 13 which are clipped on the leaf profiles 11 thus enclosing an edge of the panel 10.

Typically, the leaf profiles 11 are composed of half-shells 14, respectively an outer shell 14*a* and an inner shell 14*b*, which are connected by a thermal insulator 15 in the form of one or more insulating bars.

The panel 10 is supported by glazing bead supports 16 and aligned in the leaf frame by mounting blocks 17.

In some embodiments, the glazing bead supports 16 are made of synthetic material and rest on both half-shells 14, such that the weight G of the panel 10 in said known sliding window 1 is transmitted via the half-shells 14 to the roller cassettes 4 and the rollers 6 as indicated with the arrows G1 and G2 in FIG. 1.

The thermal insulator 15 is made of a material that is not suitable to absorb significant loads.

The load of the thermal insulator 15 is therefore avoided because the glazing bead supports 16 are only supported on the half-shells 14 such that the weight G is distributed practically completely over the half-shells 14 and the sum of the parts G1 and G2 of the weight over each of the half-shells 14, and thus is practically equal to the weight G of the panel 10.

The leaf frame 9 rests with its full weight on the housings 5 of the roller cassettes 4 which are fixedly connected to the half-shells 14 such that the full weight is borne completely by the half-shells of the bottom leaf profile 11 and thus not by the insulator 15.

It is understood that the half-shells 14 of the bottom leaf profile 11 have to absorb the full weight of the leaf frame 9 and that this can possibly lead to premature failure of the frame or deformation thereof, knowing that the panels 10 in glass are getting heavier over time following the application of double and triple glazing to be able to meet stricter requirements in the field of thermal insulation.

For the same reason, the width C of the thermal insulator 15 constantly increases, which weakens the strength of the leaf frame 9 whereas the weight of the panel increases.

The present disclosure offers a solution to said problem, which is illustrated based on the embodiments shown in the FIGS. 2 to 12.

The solution includes that the glazing bead supports 16 comprise a feed-through section 18 for transmitting the weight G of the panel 10 or a part thereof to the corresponding concerned housing 5 of roller cassettes 4.

Of course when several glazing bead supports 16 are applied, the weight G is distributed over the different glazing bead supports 16, whereby the feed-through section 18 of a relevant glazing bead support 16 transmits the corresponding part of the total weight G or practically said part to the relevant housing 5 of the rollers 6.

Figure 2:
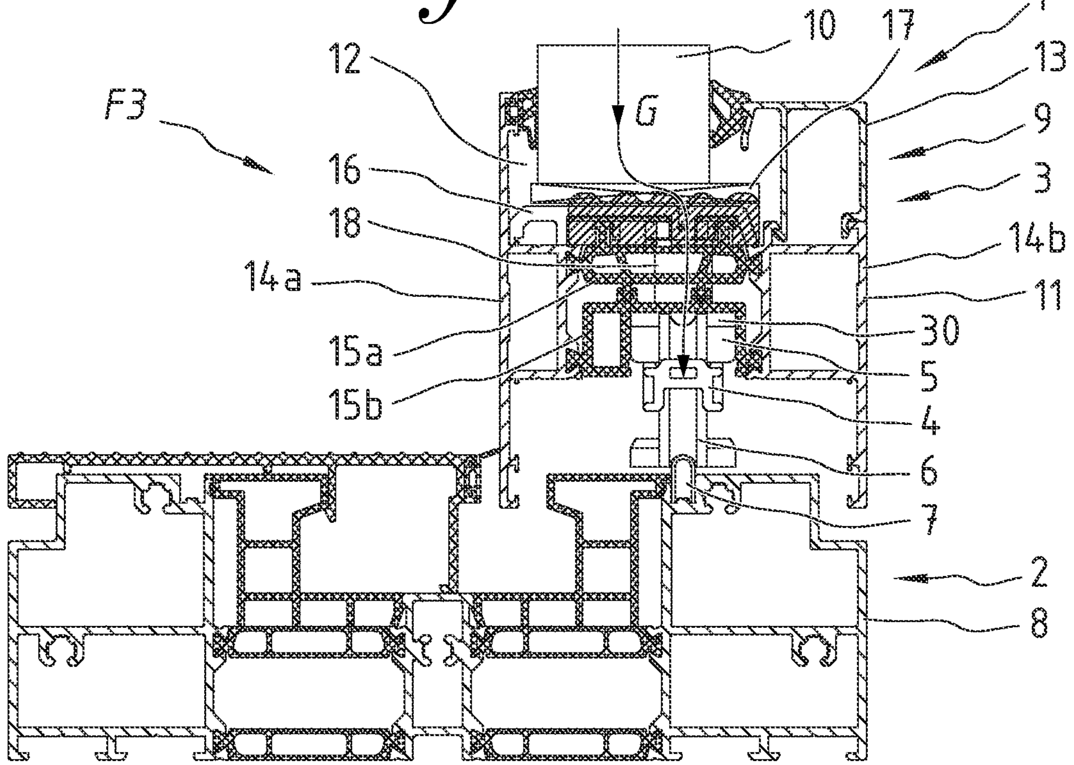
FIG. 2 shows a similar cross-section as that of FIG. 1, but for a sliding window according to the present disclosure.
Figure 5:
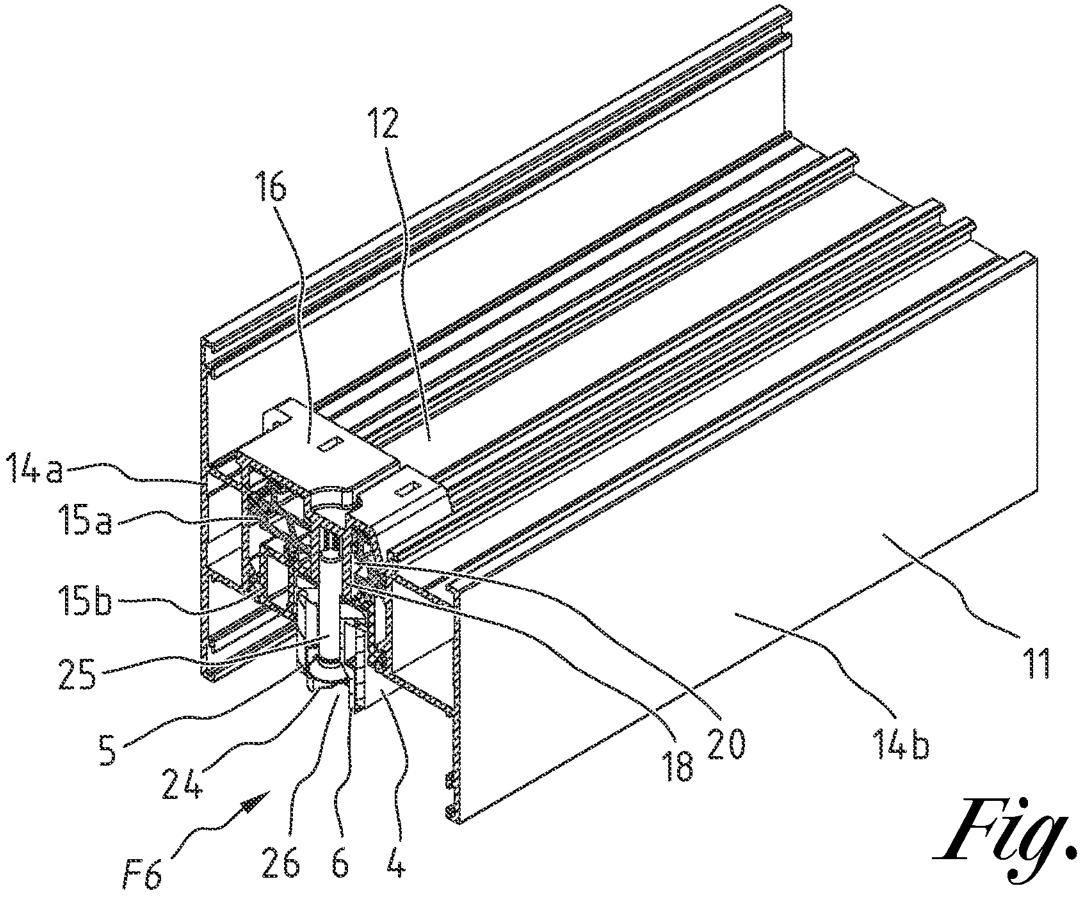
FIG. 5 shows a perspective view of a cross-section according to the section V-V in FIG. 4.
Figure 6:
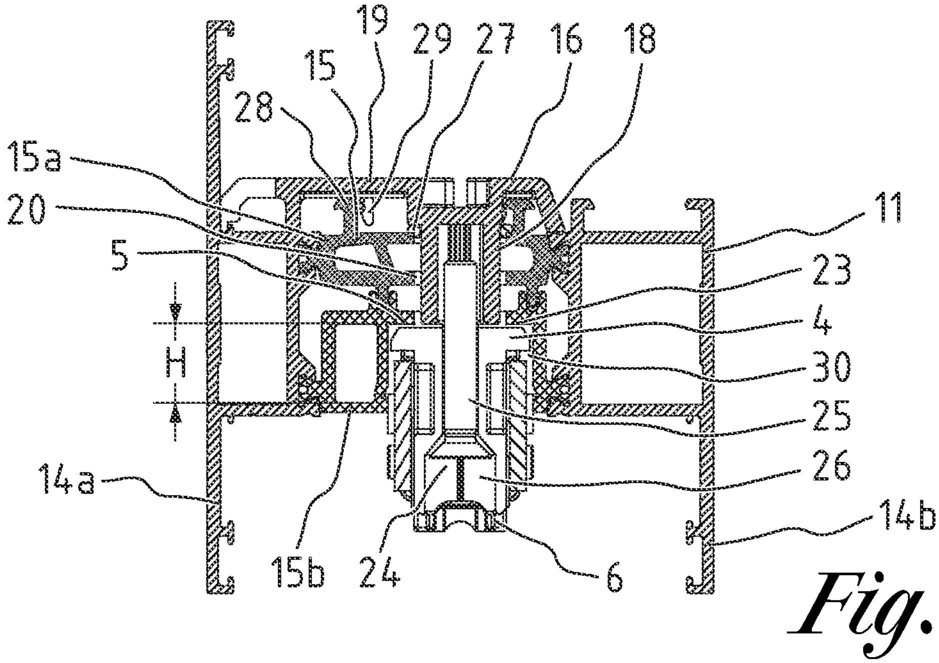
FIG. 6 shows a view according to the arrow F6 in FIG. 5.

According to the present disclosure the feed-through section 18 of a glazing bead support 16 extends at least through a section of the thermal insulator 15 up to concerned said housing 5 of the roller cassettes 4, as shown in more detail in the FIGS. 2, 5 and 6.

As illustrated in FIG. 2 by the arrows G, the path of the force transmission from the panel 10 to the housing 5 of the roller cassettes 4 is directed vertically, or practically vertically, and transmitted directly via the feed-through section 18 to the housings 5 without the half-shells 14*a* and 14*b* and the insulator 15 being significantly impacted thereby.

Figure 7:
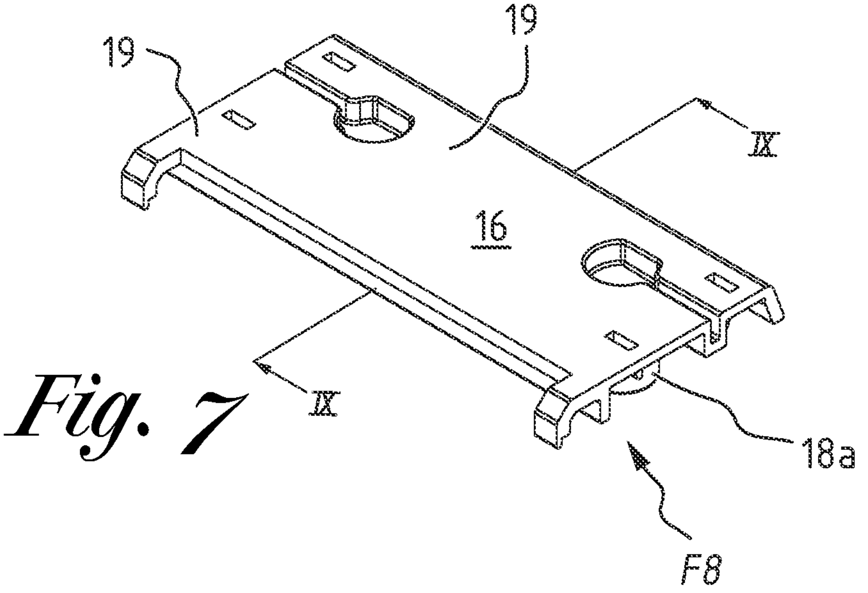
FIG. 7 shows a perspective view of the glazing bead support indicated in FIG. 4 with F7.
Figure 8:
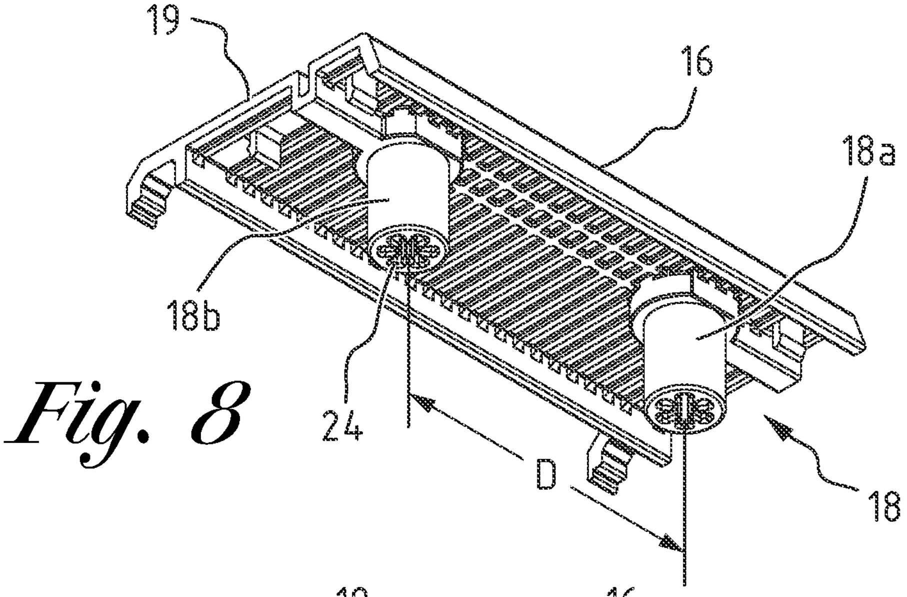
FIG. 8 shows a perspective bottom view according to arrow F8 in FIG. 7.
Figure 9:
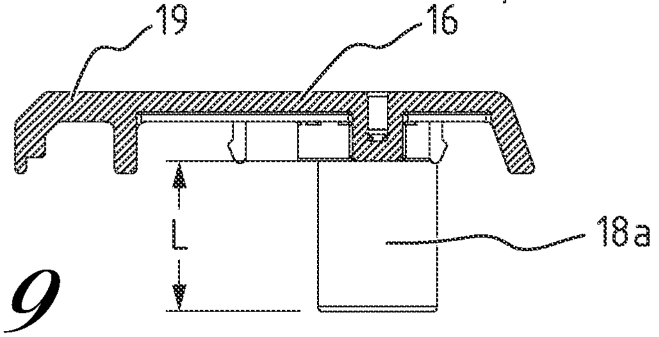
FIG. 9 is a cross-section according to the section IX-IX indicated in FIG. 7.

The form of the glazing bead supports 16 is shown in more detail in the FIGS. 7 to 9.

More specifically, such glazing bead support 16 comprises a plate-shaped section 19 which is intended to support an edge of the panel 10.

In this case, the feed-through section 18 is formed by two cylindrical protrusions 18*a* and 18*b* which extend with a certain length L in complementary passages 20 provided in the thermal insulator 15 and which are mounted perpendicularly to the underside of the plate-shaped section 19.

In the example shown in the figures, the sliding window 1 is provided with one or more roller cassettes 4 which each serve as a housing 5 for the rollers 6.

Figure 3:
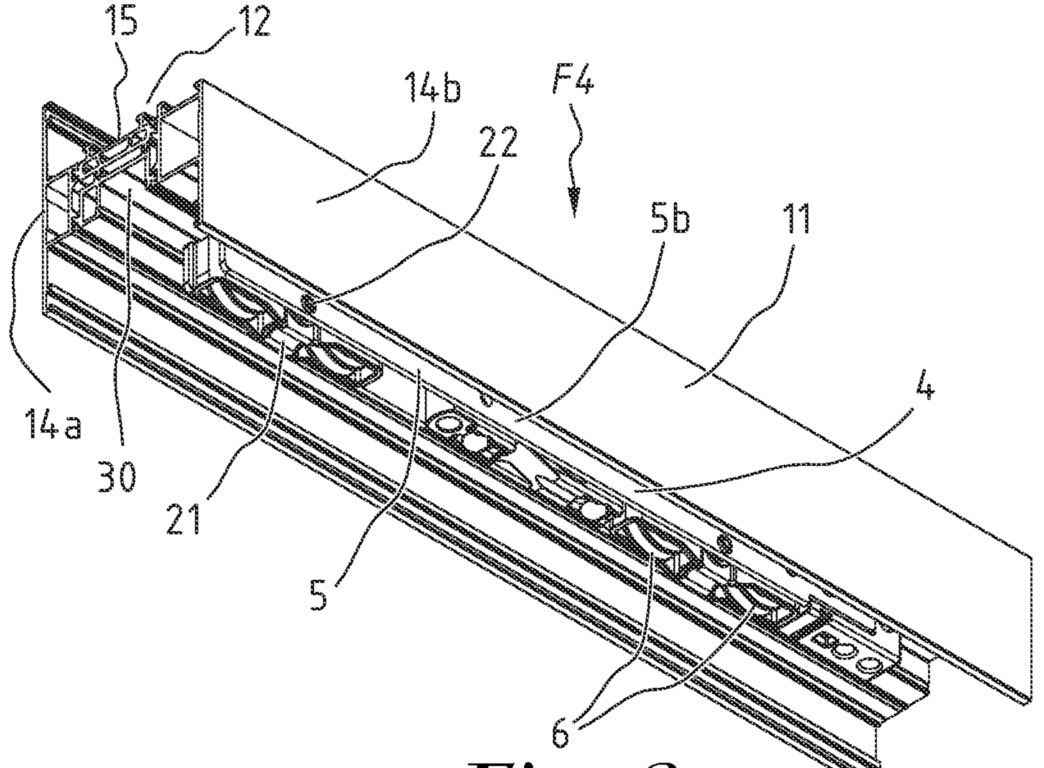
FIG. 3 shows a perspective view of the section indicated in FIG. 2 with arrow F3.
Figure 4:
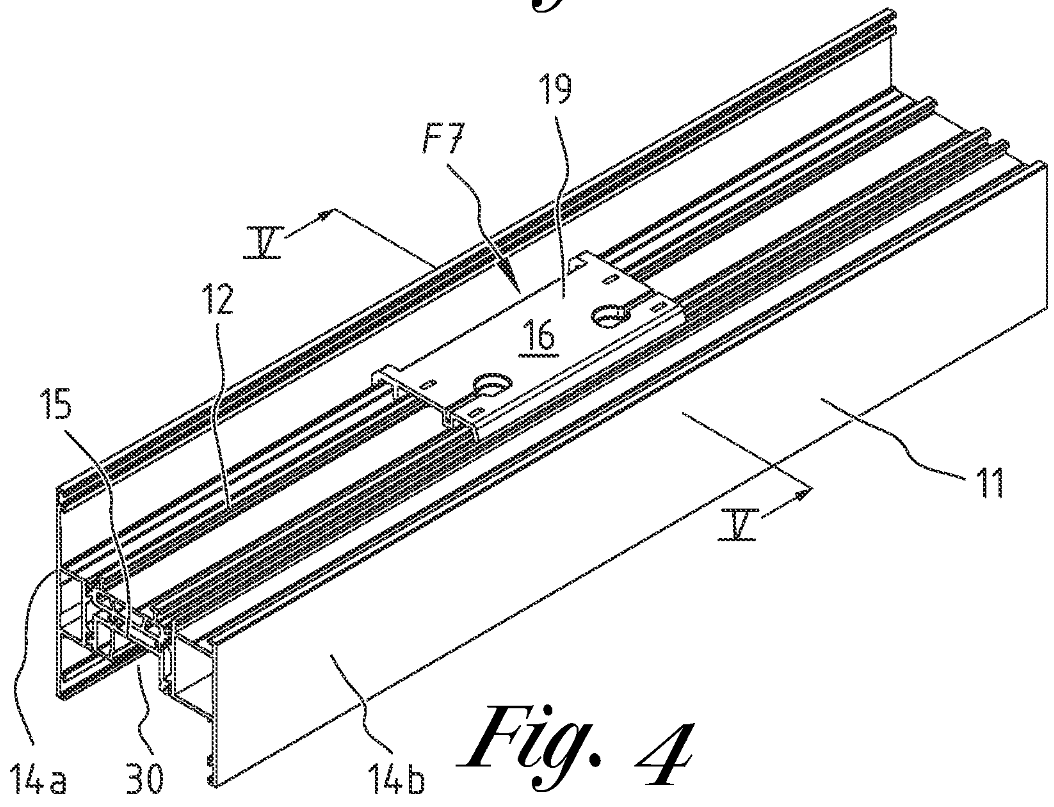
FIG. 4 shows a top view according to arrow F4 in FIG. 3.

This is visible in more detail in FIG. 3 for example.

The housing 5 of each roller cassette 4 is hereby provided with two parallel walls 5*a* and 5*b*.

In the case of the figures the rollers 6 of a roller cassette 4 are always mounted in pairs in a roller module 21, whereby each roller 6 is mounted separately rotatably in the concerned roller module 21.

Each roller module 21 itself is mounted tiltably in the roller cassette 4 by said transversal shaft 22 which is centrally mounted on the relevant roller module 21 and which is attached between the walls 5*a* and 5*b* of the housing 5.

The panel 10 is supported by the glazing bead supports 16 and by the transmission of the load of the weight G through the feed-through section 18 on an upper surface 23 of the roller cassettes 4.

In the example shown the rollers 6 of a roller cassette 4 are moreover aligned according to one straight line, but according to the present disclosure it is not excluded for example to also provide rollers 6 in pairs next to each other or to apply completely different configurations.

In the embodiment shown in the FIGS. 2 to 9, the protrusions 18*a* and 18*b*, which together form the feed-through section 18 of a glazing bead support 16 of the sliding window 1, are provided with an internal screw pitch 24 with internal thread or with an internal form which allows a screw 25 to be screwed into the relevant protrusion 18*a* or 18*b*.

The housing 5 of rollers 6 or in this case a roller cassette 4 is hereby provided with holes 26 located at a distance D from each other according to the distance D between the protrusions 18*a* and 18*b* of the glazing bead support 16 or the distance D between the passages 20 in the thermal insulator 15.

It is not excluded that in some cases the distances D do not correspond, in which case it is possible to split the glazing bead support 16 into two parts, each with one protrusion 18, such that the weight in that case is distributed over the two parts. Optionally, the glazing bead supports 16 can be provided with a weakening along which the glazing bead support can be broken into two halves more easily.

Nor is it excluded that the glazing bead supports 16 have only one single protrusion 18 and per roller cassette 4 several glazing bead supports 16 are applied to directly transmit the weight of the panel 10 to one roller cassette 4. Consequently, after mounting or installing such housing 5 of the roller cassette 4 to the thermal insulator 15, the housing 5 of the roller cassette 4 can be attached to a glazing bead support 16 by inserting screws 25 through the holes 26 in the housing 5 and screwing them into the screw pitch 24 of the protrusions 18*a* and 18*b*.

Of course said passages 20 and holes 26 can be drilled at the moment of mounting or can be realised beforehand during the production of the components of the sliding window 1.

In some embodiments of a sliding window 1 according to the present disclosure, a flexible O-ring or seal 27 has been mounted over the protrusions 18*a* and 18*b* of each glazing bead support 16.

This prevents water infiltration to the underlying zone.

In the example discussed here, the thermal insulator 15 is composed of two insulating bars 15*a* and 15*b* in the form of hollow profiles made of synthetic material which can be fittingly mounted in or against each other.

The first insulating bar 15*a* is hereby provided with details 28 that can cooperate with hook-shaped details 29 provided on the glazing bead support 16 or glazing bead supports 16 for securing the glazing bead support 16 on the thermal insulator 15.

The second insulating bar 15*b* is in this case provided with a lengthwise groove 30 which allows the roller cassette 4 to be flush-mounted with a certain height H in the thermal insulator 15 up against the base of the relevant groove 30. Said groove 30 can also be omitted, in which case the roller cassette 4 is mounted against the flat underside of the second insulating bar 15*b* for example.

Figure 10:
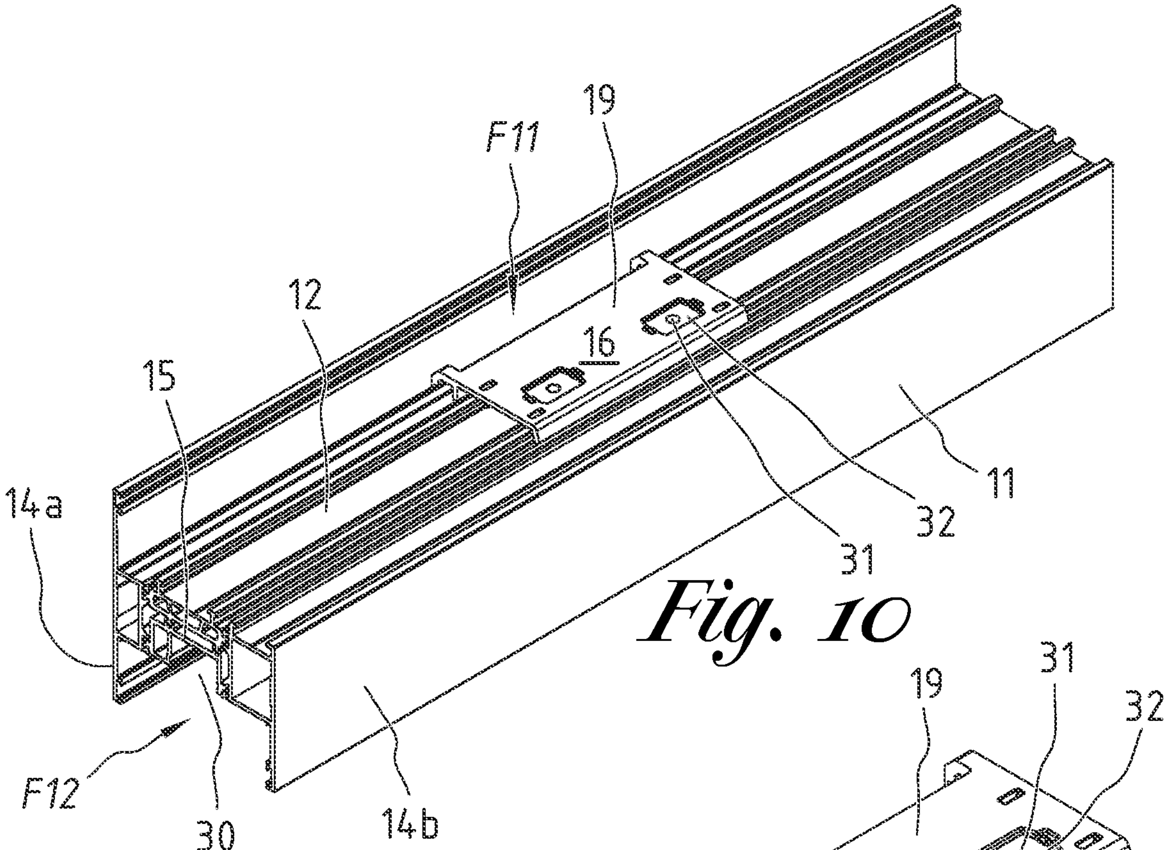
FIG. 10 shows a top view of the relevant profile of another embodiment of a sliding window according to the present disclosure.
Figure 11:
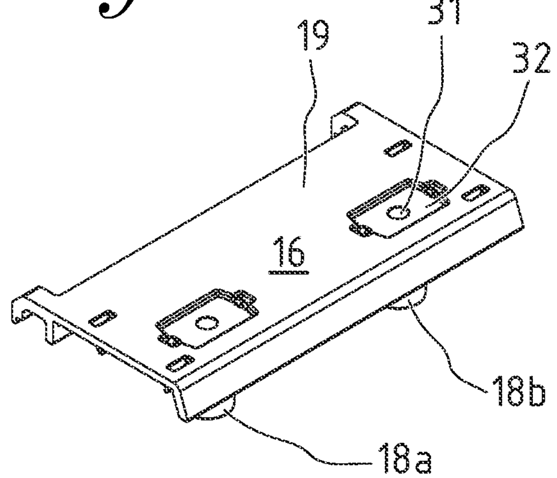
FIG. 11 shows a top perspective view of the glazing bead support indicated in FIG. 10 with F11; and, FIG. 12 is a side view according to the arrow F12 of FIG. 10.
Figure 12:
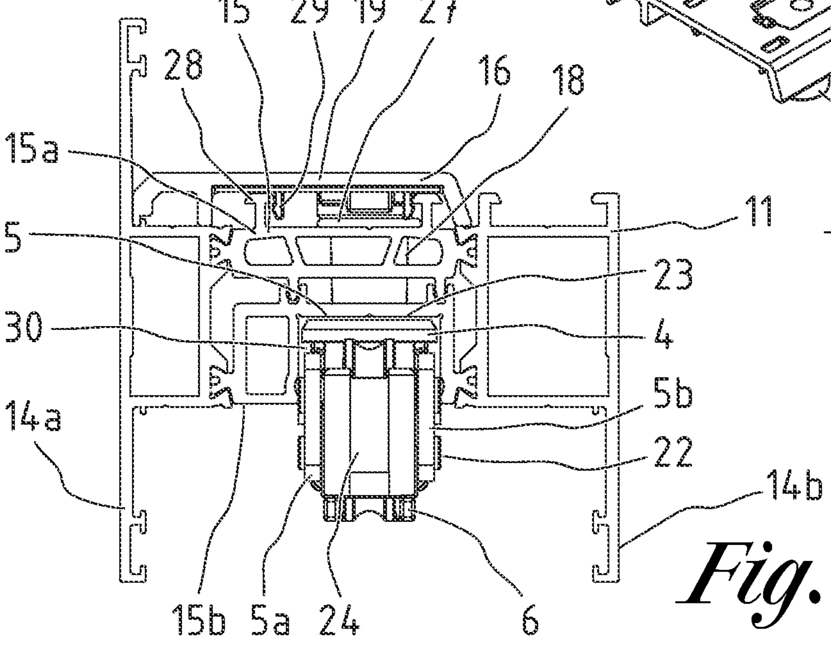

FIGS. 10 to 12 show more parts of another embodiment of a sliding window 1 according to the present disclosure, whereby the protrusions 18*a* and 18*b* on the glazing bead support 16 this time are each provided with an internal passage 31 which extends completely through the relevant protrusion 18 as well as through the plate-shaped section 19.

In the plate-shaped section 19 at the top, non-round recesses 32 are provided in which a nut (not shown) is or can be mounted for a bolt which can be screwed through a passage 31 from below in a relevant nut for attaching the roller cassette 4 against the protrusions 18*a* and 18*b* of the feed-through section 18.

The nut can be mounted or pressed in the glazing bead support 16 during production or can for example also be snapped into a recess 32 during assembly on site.

The non-round shape of the recesses 32 and a corresponding non-round shape of the nut can prevent the nut from rotating together with the bolt. Alternatively, rotation can also be prevented because the nut, with or without a round shape, is worked into the synthetic glazing bead support 16 during the production of a synthetic glazing bead support 16.

The present disclosure is not limited to the embodiments of a sliding window or sliding door 1 and of a glazing bead support applied thereby according to the present disclosure described by way of example and illustrated with reference to the figures, but such sliding window or sliding door can be realised in all sorts of other ways without departing from the scope of the present disclosure.

The invention claimed is:

1. A sliding window or sliding door with a leaf, the leaf comprises a leaf frame that is composed of leaf profiles wherein a panel is mounted, whereby each leaf profile comprises two half-shells which are thermally connected to each other by an intermediate thermal insulator, whereby the leaf frame contains a rebate and one or more glazing bead supports which support the panel in the rebate and whereby the leaf frame is supported by one or more roller cassettes with rollers, wherein the one or more glazing bead supports are separate from the roller cassettes, wherein the at least one glazing bead support comprises a feed-through section for transmitting a weight of the panel or a part thereof to at least one concerned roller cassette and that the feed-through section extends through a bottom leaf profile of the leaf frame up to the at least one concerned roller cassette, wherein the thermal insulator includes a passage, and wherein the feed-through section is formed by at least one protrusion which extends a certain length within the passage in the thermal insulator.

2. The sliding window or sliding door according to claim 1, wherein the one or more glazing bead supports comprises a plate-shaped section configured to support an edge of the panel.

3. The sliding window or sliding door according to claim 1, wherein the one or more roller cassettes includes a housing provided with two parallel walls between which the rollers or assemblies of rollers are mounted on transversal shafts which extend between the parallel walls and whereby the panel is supported by the one or more glazing bead supports with their feed-through section on an upper surface of the housing of the one or more roller cassettes.

4. The sliding window or sliding door according to claim 3, wherein the rollers of the one or more roller cassettes are aligned according to one straight line.

5. The sliding window or sliding door according to claim 3, wherein the rollers of the one or more roller cassettes are mounted in pairs in a roller module to form the assemblies of rollers, whereby each roller is mounted separately rotatably in the roller module and whereby each roller module of the one or more roller cassettes is mounted tiltably in the roller cassette by the transversal shaft which is mounted centrally on the roller module.

6. The sliding window or sliding door according to claim 3, wherein the thermal insulator is provided with one or more grooves which extend lengthways thereof, whereby one relevant groove of the one or more grooves allow the roller cassette with a certain height to be flush-mounted in the thermal insulator up against a base of the relevant groove.

7. The sliding window or sliding door according to claim 2, wherein the at least one protrusion of the feed-through section from against the one or more glazing bead supports is provided with a screw pitch with internal thread or with an internal form which allows a screw to be screwed in the relevant protrusion, whereby a housing of the one or more roller cassettes is provided with at least one hole, such that, after mounting such one or more roller cassettes against the thermal insulator, the housing of the one or more roller cassettes is configured to be attached to one or more glazing bead supports by inserting the screw through the at least one hole in the housing and screwing it in the screw pitch of the at least one protrusion.

8. The sliding window or sliding door according to claim 3, wherein the at least one protrusion of the feed-through section is provided with an internal passage and whereby the housing of the one or more roller cassettes is provided with at least one hole, such that, after mounting such housing against the thermal insulator, the housing of the one or more roller cassettes can be attached to the one or more glazing bead supports by inserting a bolt through the at least one hole and through the internal passage and securing the bolt using a nut which is located in a recess of the plate-shaped section.

9. The sliding window or sliding door according to claim 2, wherein a flexible O-ring or seal is mounted over the at least one protrusion of each of the one or more glazing bead supports.

10. The sliding window or sliding door according to claim 1, wherein the thermal insulator is provided on a rebate side with at least one detail configured to cooperate with a hook-shaped detail provided on the one or more glazing bead supports to snap the one or more glazing bead supports on the thermal insulator.

11. The sliding window or sliding door according to claim 1, wherein the one or more glazing bead supports have a breadth which completely spans the insulator breadthways.

12. The sliding window or sliding door according to claim 2, wherein the length of the feed-through section is such that the panel is supported completely on the one or more roller cassettes.

13. The glazing bead support used in the sliding window or sliding door according to claim 1, the glazing bead support is executed with a plate-shaped section on one side of the feed-through section to feed through the weight of the panel.

14. The glazing bead support according to claim 13, wherein the plate-shaped section and the feed-through section are produced in one piece in synthetic material.

15. The sliding window or sliding door according to claim 4, wherein the rollers of the one or more roller cassettes are mounted in pairs in a roller module to form the assemblies of rollers, whereby each roller is mounted separately rotatably in the roller module and whereby each roller module of the one or more roller cassettes is mounted tiltably in the roller cassette by the transversal shaft which is mounted centrally on the roller module.

16. The sliding window or sliding door according to claim 4, wherein the thermal insulator includes one or more grooves which extend lengthways thereof, whereby one relevant groove of the one or more grooves allow the roller cassette with a certain height to be flush-mounted in the thermal insulator up against a base of the relevant groove.

17. The sliding window or sliding door according to claim 5, wherein the thermal insulator includes one or more grooves which extend lengthways thereof, whereby one relevant groove of the one or more grooves allow the roller cassette with a certain height to be flush-mounted in the thermal insulator up against a base of the relevant groove.

* * * * *